United States Patent
Bennett et al.

(10) Patent No.: US 8,608,105 B2
(45) Date of Patent: Dec. 17, 2013

(54) STEERABLE AXLE

(75) Inventors: Ian Robert Bennett, Gloucestershire (GB); Robert Menezes, Gloucestershire (GB); Paul Shaw, Gloucestershire (GB)

(73) Assignee: Messier-Dowty Ltd, Gloucestershire (GB)

(*) Notice: Subject to any disclaimer, the term of this patent is extended or adjusted under 35 U.S.C. 154(b) by 0 days.

(21) Appl. No.: 13/578,096

(22) PCT Filed: Feb. 10, 2010

(86) PCT No.: PCT/GB2010/000244
§ 371 (c)(1),
(2), (4) Date: Oct. 11, 2012

(87) PCT Pub. No.: WO2011/098745
PCT Pub. Date: Aug. 18, 2011

(65) Prior Publication Data
US 2013/0020431 A1 Jan. 24, 2013
US 2013/0161445 A2 Jun. 27, 2013

(51) Int. Cl.
*B64C 25/50* (2006.01)

(52) U.S. Cl.
USPC .................. 244/50; 244/103 R; 244/102 SS

(58) Field of Classification Search
USPC ...... 244/50, 99.2, 99.7, 102 R, 102 A, 100 R, 244/103 R, 102 SS, 102 SL, 104 FP, 99.5, 244/99.9; 248/543; 92/5 I, 18, 24, 27, 41, 44
See application file for complete search history.

(56) References Cited

U.S. PATENT DOCUMENTS

| | | | |
|---|---|---|---|
| 2,221,979 A | 11/1940 | Levy | |
| 3,415,167 A | 12/1968 | Champagne | |
| 3,605,568 A | 9/1971 | Nepp | |
| 3,845,919 A * | 11/1974 | Jenny | 244/103 R |
| 4,167,891 A * | 9/1979 | Kamimura | 91/408 |
| 4,295,413 A * | 10/1981 | Kamimura | 92/5 L |
| 4,742,758 A * | 5/1988 | Della Rocca | 92/24 |
| 5,050,484 A * | 9/1991 | Kamimura | 92/5 L |
| 5,207,398 A * | 5/1993 | Veaux et al. | 244/100 R |
| 5,513,821 A * | 5/1996 | Ralph | 244/50 |
| 5,595,359 A * | 1/1997 | Meneghetti | 244/50 |
| 5,613,651 A | 3/1997 | Meneghetti | |
| 5,743,491 A * | 4/1998 | Meneghetti | 244/104 FP |
| 2005/0231031 A1 | 10/2005 | Bellouard et al. | |

FOREIGN PATENT DOCUMENTS

GB 1032243 A 6/1966

OTHER PUBLICATIONS

International Search Report dated Mar. 11, 2013 issued in International patent application No. PCT/GB2010/000244.
Partial International Search Report for PCT/GB2010/000244 dated Jul. 1992; reprint Jan. 2004.

* cited by examiner

*Primary Examiner* — Christopher P Ellis
*Assistant Examiner* — Medhat Badawi
(74) *Attorney, Agent, or Firm* — Sughrue Mion, PLLC

(57) ABSTRACT

There is described a landing gear having a bogie including a elongated beam (2) for accommodating at least two axles receiving each a pair of ground engaging wheels, at least one axle (5) being pivotally mounted on the elongated beam. The landing gear further includes axle travel limitation means (10) extending between said pivotable axle and said elongated beam to be hitched up thereto, said travel limitation means being deformable one way starting from an stable and lockable state thereof corresponding to a landing position of said pivotable axle. There are also described independently lockable and actuatable telescopic struts.

15 Claims, 2 Drawing Sheets

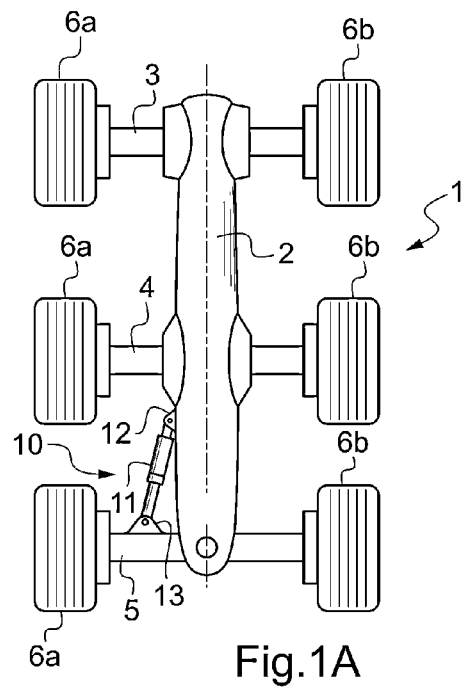
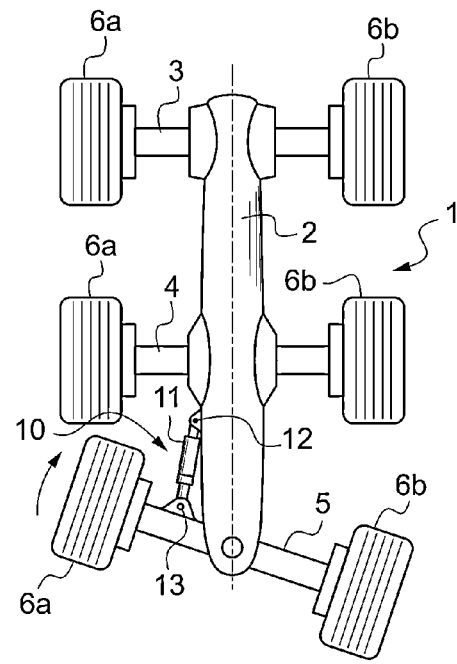
Fig.1A
Fig.1B
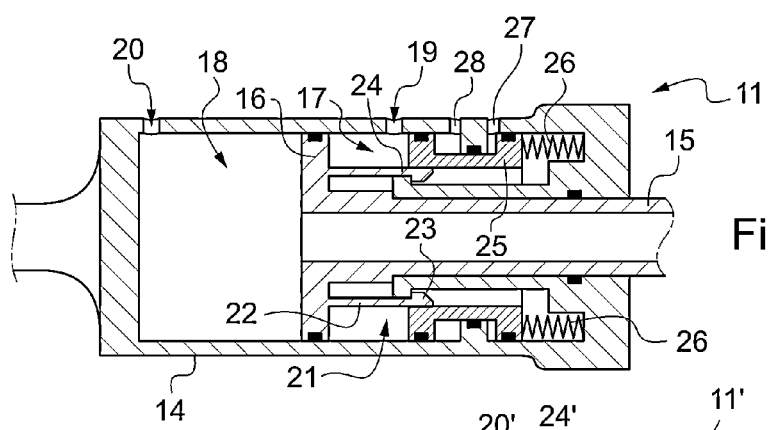
Fig.2A
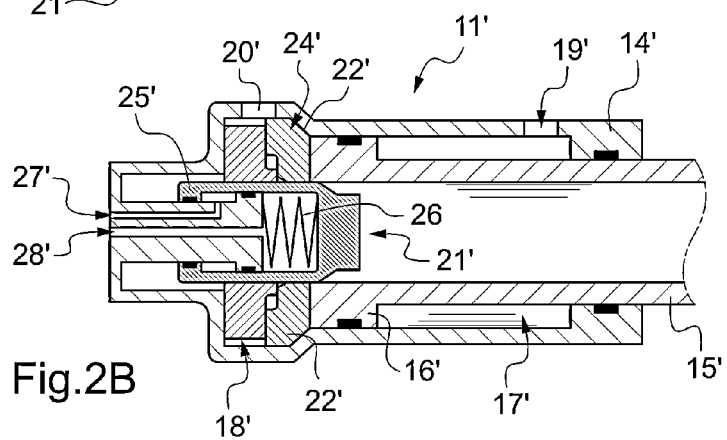
Fig.2B

STEERABLE AXLE

PRIOR ART

Large aircraft are generally provided with multi-axle landing gears having trucks or bogies carrying pairs of wheels. Such bogies include an elongated beam supporting a plurality of transversely extending axles, each axle carrying a pair of wheels.

Some recent large aircraft are equipped with main landing gears having six-wheels bogies with one rear pivotable axle so that said axle and associated wheels can be steered in coordination with steering of the nose landing gear wheels.

U.S. Pat. No. 5,242,131 assigned to BOEING illustrates axle steering means having actuators arranged in a push-pull fashion. U.S. Pat. No. 5,595,359 assigned to BOEING illustrates axle steering means having one actuator arranged in a walking beam fashion. U.S. Pat. No. 5,613,651 assigned to BOEING illustrates axle steering means having one actuator extending between the bogie and the axle and articulated thereto. These arrangements accommodate a two-way steering so that the axle can be steered both sides of a landing position in which the axle is brought back and locked for take-off or landing.

To this end, the steering means are equipped with lock means, such as center-lock means within the steering actuator as in U.S. Pat. No. 5,613,651, or external locking means having a lock supported by the bogie to engage a recessed portion of axle in the landing position as in WO2006071262 to GOODRICH. However, such locks will engage only if the axle is accurately brought back in the landing position, which is difficult to achieve.

U.S. Pat. No. 2,943,820 teaches to mount an aft portion of the bogie pivotable with respect to a fore portion of the bogie in a one-way free-castoring relation when unlocked. The aft portion is allowed to castor between a landing position where the aft portion is aligned with the fore portion, and a one-way, maximum angled position. When the aircraft turns, the aft portion of the bogie of the inner landing passively pivots so as the tires of the rear wheels do not scuff, whereas the aft portion of the bogie of the outer landing gear remains in the landing position. However, the articulation of the aft portion on the fore portion is highly loaded and would be difficult to implement in case of a six-wheel bogie with a center axle. Furthermore, having the aft portion coming back to the landing position may require the pilot to proceed to some S-turns before taking off, which may consume some take-off runway length.

OBJECT OF THE INVENTION

It is an object of the invention to provide a bogied landing gear with at least one steerable axle which is simpler that the known landing gears.

BRIEF DESCRIPTION OF THE INVENTION

There is provided a landing gear having a bogie including a elongated beam for accommodating at least two axles receiving each a pair of ground engaging wheels, at least one axle being pivotally mounted on the elongated beam. In accordance with the invention, the landing gear further includes axle travel limitation means extending between said pivotable axle and said elongated beam to be hitched up thereto, said travel limitation means being deformable one way starting from a stable and lockable state thereof corresponding to a landing position of said pivotable axle.

Thus, the axle landing position is simply defined by the stable state of the travel limitation means. This implies that the axle may only be castored one way.

Therefore, locking the pivotable axle in the locking position is simply achieved by bringing the axle back to the landing position until the travel limitation means reaches its stable state, where it can be made to automatically lock so as to lock the axle into the landing position. This locked state corresponds to and end-of-stroke position, which makes it much easier to lock compared to any intermediate locking configuration.

In accordance with one particular embodiment of the invention, said travel limitation means comprise a telescopic strut having ends articulated respectively to said pivotable axle and said elongated beam, so that the first stable lockable state corresponds to one of fully extended or fully compressed configuration of said telescopic strut. This telescopic strut may also serve as a steering actuator.

In accordance with another particular embodiment of the invention, said travel limitation means comprise two members articulated to each other and having ends articulated respectively to said pivotable axle and said elongated beam so that the stable lockable state corresponds to a substantially aligned configuration of said members.

BRIEF DESCRIPTION OF THE FIGURES

The invention will be better understood in the light of the description of several embodiment, in reference to the following figures:

FIGS. 1A and 1B are top views of a bogie of a landing gear equipped with a rear pivotable axle according to a first particular embodiment of the invention, illustrated in landing position and in some angled position, respectively;

FIG. 2A is a sectional view of one particular embodiment of a telescopic strut than may be used for the landing gear of FIGS. 1A and 1B, illustrated in an stable fully extended and locked state;

FIG. 2B is a sectional view of another particular embodiment of a telescopic strut that may be used for the landing gear of FIGS. 1A and 1B, illustrated in a stable fully extended and locked state;

DETAILED DESCRIPTION OF THE FIGURES

Figure 3:
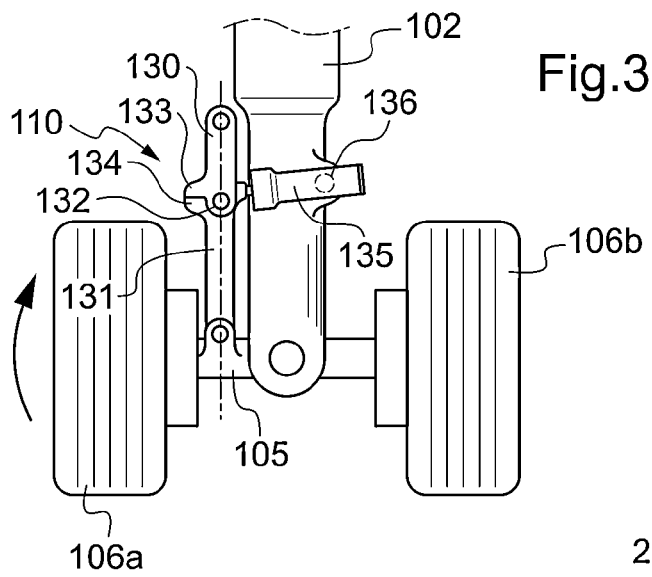
FIG. 3 is a top view of the rearmost part of a bogie of a landing gear equipped with a pivotable axle according to a second particular embodiment of the invention, illustrated in landing position.

In accordance to a first embodiment of the invention illustrated at FIGS. 1A and 1B, there is provided a landing gear with a six-wheel bogie 1. Said bogie 1 comprises an elongated beam 2 accommodating three axles, namely a front axle 3 and a center axle 4 that are fixedly mounted on the elongated beam and a rear axle 5 pivotally mounted at a rear end of the elongated beam 2 around a substantially vertical axis substantially crossing a longitudinal axis of the rear axle 5. Each axle 3,4,5 carries a pair of ground engaging wheels 6a, 6b. The bogie 1 is equipped with travel limitations means 10 comprising a telescopic strut 11 having ends 12,13 articulated to the elongated beam 2 and to the pivotable axle 5 respectively.

In the situation illustrated at FIG. 1A, the pivotable axle 5 is in landing position and the telescopic strut 11 is in a fully extended state, which is a lockable and therefore stable state, as will be explained below in relation with FIG. 2. In the situation illustrated at FIG. 1B, the pivotable axle 5 is in some angled position, the telescopic strut 11 being in an intermediate position between the fully extended state and a fully retracted state. It will be immediately appreciated that the pivotable axle 5 can only be pivoted one way. The illustrated bogie should therefore be fitted on a left hand main landing gear of an aircraft, whereas the corresponding right hand main landing gear should be fitted with a symmetrical bogie having its rear axle pivoting the other way.

Referring now to FIG. 2A, and in accordance with a aspect of the invention, the telescopic strut 11 includes a cylinder 14 for sealingly receiving a sliding rod 15 equipped with a piston 16 that defines into the cylinder 14 a shorten chamber 17 and a extend chamber 18 that may be hydraulically serviced through a shorten port 19 and an extend port 20 respectively if it is desired that the telescopic strut 11 serve as an steering actuator.

The telescopic strut 11 is equipped with lock means 21 for automatically locking the telescopic strut into the fully extended state when the axle is brought back to the landing position. As illustrated, the lock means 21 may be a claw lock mechanism, including claw bendable fingers 22 attached to piston 16 and having hook-like ends 23 for engaging a projection 24 of an inner protruding portion 25 of cylinder 14. A locking piston 25 is slidably mounted within the cylinder 14 to be operable between a skipped position to which the locking piston 25 is pushed by the fingers ends 23 when the telescopic strut arrives to the fully extended state, and a covering or locking position (as shown) where it is biased by springs 26 to cover the fingers ends 23 so as to prevent the fingers 22 from bending when the finger ends 23 have passed the projection 24. Unlock and lock ports 27,28 allow for selectively moving the locking piston 25 between the skipped position and the locking position.

The rear axle 5 pivoting may be operated in a passive castoring mode. After landing with the axle being locked in the landing position, and when the aircraft has slowed down below a given speed, the locking piston 25 may be controlled as to uncover the claw fingers 22, so that, in the event of the aircraft turning, the rear axle of the inner main landing gear will naturally rotate to track the turning of the aircraft, whereas the rear axle of the outer main landing gear will stay in the landing position, although unlocked. To relock the rears axles in the landing position prior to take-off, the locking and unlocking ports of the locking piston may be connected to the hydraulic return circuit, whereas the extend chamber of the telescopic strut may be pressurized. If not already in the fully extended state, the telescopic strut will then be forced to extend until it reaches its fully extended state, in which it will automatically lock, therefore causing the axle to be locked into the landing position. This is a very simple, open-loop style locking, with no need for accurate angular positioning of the rear axle.

The rear axle 5 pivoting may also be operated in an active steering mode. After landing with the axle being locked in the landing position, and when the aircraft speed has slowed down below a given speed, rotation of the rear axle 5 may be controlled so as to be coordinated with steering of the nose landing gear. When the nose steering angle has reached a given angle threshold (say 20 degrees), the locking piston 25 may be displaced to the skipped position to uncover the claw fingers 22 in order to allow for controlled steering of the rear axle 5 by means of the telescopic strut 11 used as a steering actuator. The steering of the rear axle 5 may for instance be made proportional to the steering of the nose landing gear wheels. The steering of the rear axle 5 may also be performed in an active ON/OFF mode, in which, in response to the nose steering angle reaching said given angle threshold, the bogie rear axle is pivoted from its aligned position to a given maximum angled position, defined by the telescopic strut 11 reaching its fully compressed configuration. Having the rear axle pivoting back to the landing position may be commanded in response to the nose steering angle crossing back the same angle threshold, or another angle threshold.

It will be appreciated that the telescopic strut 11 is equipped with four ports (two for displacing the piston rod, and two for independently controlling the locking piston). The telescopic strut 11 may preferably be operated as follows. When it is desired to unlock the telescopic strut 11, the extend port 20 may be pressurized first so as to offload the locking mechanism. Then the unlock port 27 may be pressurized, so as to move the piston 25 to its skipped position. This not only alleviates the risk of a jammed locking piston, but also allows for a soft unlocking, avoiding any unlocking shock sound that is often generated when unlocking under load. Then, the extend port 20 may be connected to return, whereas the shorten port 19 may be pressurized in order to steer the rear axle 5. The unlock and lock ports 27,28 may then be connected to return.

It will then be appreciated that the telescopic strut 11 is then used as a steering actuator, but still serving as axle travel limitation means. To lock the rear axle 5 in the landing position, it suffices to pressurize the extend chamber 18 until the telescopic strut 11 is brought back to the fully extended position in which it automatically locks. There is no need for an accurate and difficult controlled positioning of the axle to allow it to be locked.

Obviously, the telescopic may be positioned the other side of the bogie beam, still allowing the axle to pivot the same way as indicated by the arrow of FIG. 1. The stable lockable state of the telescopic strut will then correspond to a fully compressed state. A telescopic strut 11' suitable for being locked in the fully compressed state is illustrated at FIG. 2B. The telescopic strut 11' includes a cylinder 14' for sealingly receiving a sliding rod 15' equipped with a piston 16' that defines into the cylinder 14' a shorten chamber 17' and a extend chamber 18' that may be hydraulically serviced through a shorten port 19' and an extend port 20' respectively if it is desired that the telescopic strut 11' serve as a steering actuator.

The telescopic strut 11' is equipped with lock means 21' for automatically locking the telescopic strut 11' into the fully compressed state when the rear axle 5 is brought back to the landing position. As illustrated, the lock means 21' may be a segment lock mechanism, including a plurality of radially movable segments 22' received in a recess portion of piston 16'. A locking piston 25' is slidably mounted within the cylinder 14' to be operable between a skipped position to which the locking piston 25' is pushed by the segments 22' when the telescopic strut arrives to the fully compressed state, and a locking position (as shown) where it is biased by spring 26' to radially urge the segments 22' against a recessed portion 24' of cylinder 14', so as to form an obstacle preventing the piston 16' from axially moving. Locking and unlocking ports 27',28' allow for selectively moving the locking piston 25' between the skipped position and the locking position.

As previously, the shorten port 19' of the telescopic strut 11' may preferably be pressurized before pressurizing the unlock port 27', so as to offload the segments 22' and ease the unlocking operation. Only after the locking piston 25' has moved to the skipped position, the extend port 20' may be pressurized to cause the telescopic strut to extend and steer the rear axle 5.

This four-ports arrangement allows for a reverse acutation before unlocking so as to offload the lock mechanism and ease the unlocking operation. Any type of locking may be used, like segment, claw or ball lock, to lock the telescopic strut in the fully compressed or fully extended state. This kind of actuatable telescopic strut may of course find other applications, for instance to effect extension and retraction of a landing gear with respect to an aircraft structure.

However, when the risks of jamming the internal mechanism or generating a shock sound is expected to be small, one may contemplate using a more classical two-port internally lockable telescopic strut, in which the locking piston is pressurized in conjunction with the extend and shorten ports. One may even use a simple telescopic strut with no internal lock, in conjunction with some external locking means.

As a variant, bringing the rear axle back to the landing position may be helped or even solely effected by applying some differential braking on the wheels of the rear axle so as to make the rear axle pivoting back to the landing position while the aircraft is moving.

In accordance with a second embodiment of the invention illustrated at FIG. 3, on which like elements have references augmented of a hundred, the travel limitation means 110 include two members 130, 131 articulated to one another to form a knee 132 thereof, member 130 being articulated to the elongated beam 102, whereas member 131 is articulated to the pivotable rear axle 105. In the position illustrated on FIG. 3, the members 130,131 are in a substantially aligned configuration, which is a stable state thereof corresponding to the landing position of the axle 105.

The substantially aligned configuration is geometrically defined by providing the members 130, 131 with corresponding mutual abutment means 133,134. It is known to design the abutment means so as to let the members abut in a slightly overcentered position (in which the knee 132 has slightly crossed an imaginary line passing through the end articulations of the members before the members abut against one another). A telescopic actuator 135 is pivotally mounted on the elongated beam 102 by means of a pivot 136 to engage the knee 132. The actuator 135 extends substantially perpendicular to the elongated beam 102 and finds itself in an almost fully compressed state when the members 130,131 are in the substantially aligned configuration. The members 130,131 may be locked in the substantially aligned configuration by keeping the shorten chamber thereof pressurized. Alternatively, spring means may be arranged between the two members, or between one member and the elongated beam, or else between one member and the rear a axle, so as to confirm the members 103,131 in mutual abutment. Allowing the rear axle 105 to pivot is effected by pressurising the extend chamber of the actuator 135, therefore causing the members 130,131 to move out of alignment, which causes the rear axle 105 to pivot according to the arrow on the figure.

Bringing back and locking the rear axle 105 in the landing position can easily be achieved by pressurizing the shorten chamber of the actuator 135, until the travel limitation means 110 are brought back to their stable aligned configuration in which they are automatically locked.

Figure 4:
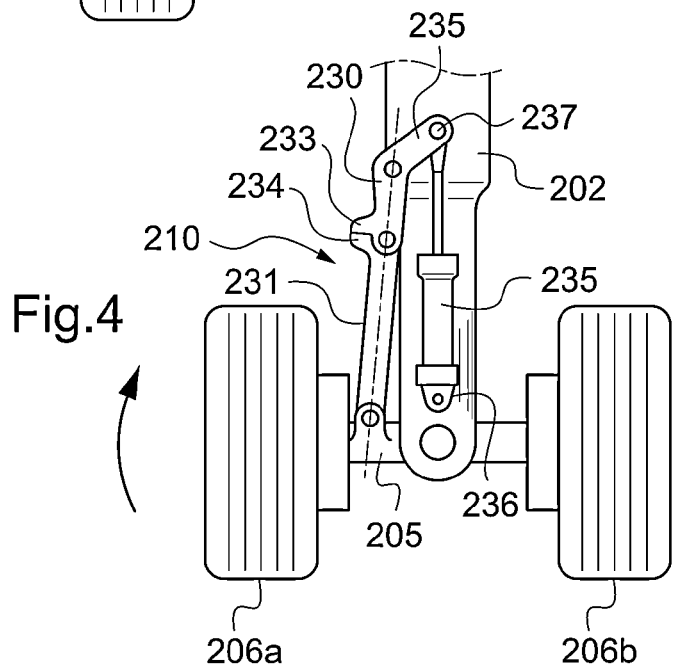
FIG. 4 is a top view of the rearmost part of a bogie of a landing gear equipped with a pivotable axle according to a third particular embodiment of the invention, illustrated in landing position.

In accordance with a third embodiment of the invention illustrated at FIG. 4, on which like elements have references augmented of a hundred, the travel limitation means 210 still include a two articulated members 230,231 arrangement with abutment means 233,234 that defines a substantially aligned configuration thereof, which constitutes a stable state thereof corresponding to a landing position of the rear axle 205. The member 231 which is articulated to the elongated beam 202 incorporates a lever 235 that is engaged by a telescopic actuator 233 that extends along the elongated beam 202. By contrast to the previous embodiment, the illustrated aligned configuration of the members 230,231 now corresponds to an almost fully extended state of the actuator 233.

The actuator 233 may serve to lock the members 230,231 in the substantially aligned configuration by keeping the extend chamber thereof pressurized. Alternatively, spring means may be arranged so as to confirm the abutment means in mutual abutment. Pivoting of the rear axle 205 is effected by pressurising the shorten chamber of the actuator 235, therefore causing the members 230,231 to move out of alignment, which causes the rear axle 205 to pivot according to the arrow on the figure.

Bringing back and locking the rear axle in the landing position can be easily achieved by pressurizing the extend chamber of the actuator 235, until the travel limitation means 210 are brought back to their stable aligned configuration in which they are automatically locked.

Figure 5:
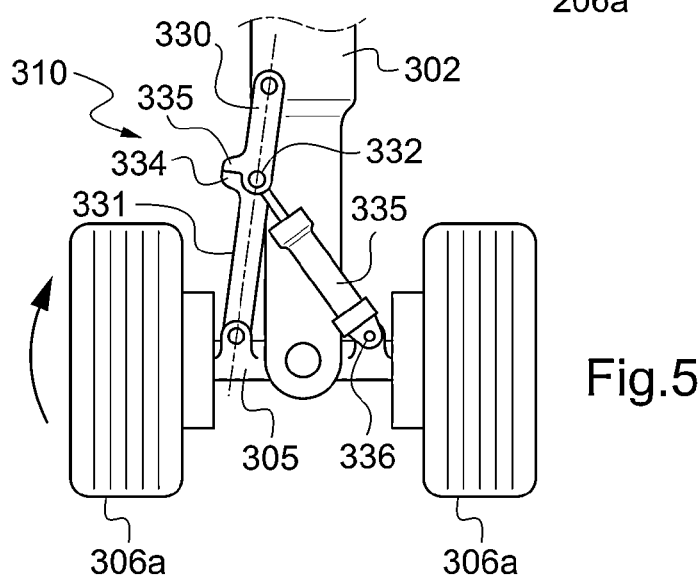
FIG. 5 is a top view of the rearmost part of a bogie of a landing gear equipped with a pivotable axle according to a fourth particular embodiment of the invention, illustrated in landing position.

In accordance to a fourth embodiment illustrated on FIG. 5, in which like elements have a reference augmented of a hundred, the travel limitation means 310 are still comprised of two articulated members 330,331 respectively articulated to the elongated beam 302 and to one side of the rear axle 305 and having mutual abutment means 333,334. A telescopic actuator 335 extends between a knee 332 of the members 330,331, and an attachment 336 protruding from the other side of the axle 305. Operation of the rear axle 305 is substantially similar to that of the second and third embodiments. However, having the actuator linked to the rear axle 305 allows for some mechanical advantage when the members are out of alignment.

The invention is not limited to what has been described, but includes any variant falling within the ambit of the claims.

In particular, while only the rear axle has been pictured to pivot, the invention may be applied also to another axle of the bogie. This invention is of course not limited to six wheels bogies, but applies to any bogie having at least one pivotable axle. Although the rear axle is pivoted around a substantially vertical axis substantially crossing a longitudinal axis of the rear axle, there may be some slight offset so as to generate a biasing torque to help the axle pivoting back to its landing position. The pivot axis may also be slightly canted.

While the actuators shown are of the linear, telescopic type, other actuators may be used, such as rotative actuators, especially in the second, third and fourth embodiment, where the member articulated on the elongated beam may be engaged by a rotative hydraulic or electric motor at its articulation on the elongated beam.

While the two articulated members type travels limitation means are pictured in a stable state corresponding to the members being substantially aligned with one member prolonging the other member, the stable state thereof can also correspond to an aligned folded back state in which one member extends under the other.

The invention claimed is:
1. A landing gear having a bogie comprising:
   an elongated beam (2; 102; 202; 302) for accommodating at least two axles each receiving a pair of ground engaging wheels,
   at least one pivotable axle (5; 105; 205; 305), said axle being pivotally mounted on the elongated beam; and axle travel limitation means (10; 110; 210; 310) extending between said pivotable axle and said elongated beam to be hitched up thereto, wherein, said travel limitation means is deformable one way starting from a stable and lockable state thereof corresponding to a landing position of said pivotable axle.

2. The landing gear according to claim 1, wherein said travel limitation means (10) comprise a telescopic strut (11) having ends articulated respectively to said pivotable axle and said elongated beam, so that said stable lockable state corresponds to one of fully extended or fully compressed configuration of said telescopic strut, said telescopic strut having internal lock means for automatically lock said telescopic in said stable state when brought back thereto.

3. The landing gear according to claim 2, wherein said telescopic strut (11; 11') includes a piston rod received in a cylinder (14; 14') in a sliding relation and being hydraulically operable by means of an extend port (20; 20') and a shorten port (19; 19'), said telescopic strut further including internal locking means (25; 25') for locking said telescopic strut in one of fully extended or fully compressed states, said locking means being hydraulically operable between a locked and unlocked state by means of a lock port (28; 28') and an unlock port (27; 27') that are independent from the extend and shorten ports.

4. The landing gear according to claim 1, wherein said travel limitation means (110; 210; 310) comprise two articulated members (130/131; 230/231; 330/331) having ends articulated respectively to said pivotable axle and said elongated beam, so that said stable lockable state corresponds to a substantially aligned configuration of said members.

5. The landing gear according to claim 4, wherein said substantially aligned configuration is defined by abutment means (133/134; 233/234; 333/334) of said members that are arranged to come in mutual engagement when said members are brought back to said substantially aligned configuration.

6. The landing gear according to claim 4, further including a steering actuator (135; 235; 335) engaging said members.

7. The landing gear according to claim 6, wherein said actuator engages a knee (132; 332) of said members.

8. A method of operating a landing gear according to claim 2, comprising using the telescopic strut as a steering actuator.

9. A method of operating a landing gear according to claim 3, comprising pressurizing said extend port if said telescopic strut is locked in the fully extended state or said shorten port if the telescopic strut is locked in the fully retracted state, before pressurizing said unlock port, so as to offload the locking means before unlocking.

10. A method of operating a landing gear according to claim 6, comprising using the actuator as a lock means for maintaining said members in the substantially aligned configuration.

11. A method of operating a landing gear according to claim 1, comprising commanding some differential braking on the wheels carried by said pivotable axle (5; 105; 205; 305) to help or effect a rotation of said pivotable axle back to said landing position.

12. The landing gear according to claim 3, wherein said extend port is pressurized if said telescopic strut is locked in the fully extended state and said shorten port is pressurized if the telescopic strut is locked in the fully retracted state, before pressurizing said unlock port, so as to offload the locking means before unlocking.

13. The landing gear according to claim 6, wherein the actuator is operable as a lock for maintaining said members in the substantially aligned configuration.

14. The landing gear according to claim 1, wherein differential braking on the wheels carried by said pivotable axle (5;105;205;305) effects a rotation of said pivotable axle back to said landing position.

15. The landing gear according to claim 2, wherein the telescopic strut is useable as a steering actuator.

* * * * *